(12) United States Patent
Shi et al.

(10) Patent No.: US 10,603,877 B2
(45) Date of Patent: Mar. 31, 2020

(54) MULTI-LAYER GREENHOUSE FILM WITH SUPERIOR ANTI-DRIPPING PERFORMANCE

(71) Applicant: Dow Global Technologies LLC, Midland, MI (US)

(72) Inventors: Qing Shi, Shanghai (CN); Hongyu Chen, Zhanjiang (CN); Daojin Hang, Shanghai (CN); Libo Du, Shanghai (CN); Andong Liu, Shanghai (CN); Yong Chen, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 81 days.

(21) Appl. No.: 15/751,247

(22) PCT Filed: Sep. 18, 2015

(86) PCT No.: PCT/CN2015/089986
§ 371 (c)(1),
(2) Date: Feb. 8, 2018

(87) PCT Pub. No.: WO2017/045199
PCT Pub. Date: Mar. 23, 2017

(65) Prior Publication Data
US 2018/0244021 A1   Aug. 30, 2018

(51) Int. Cl.
| | | |
|---|---|---|
| B32B 27/08 | (2006.01) | |
| B32B 27/20 | (2006.01) | |
| B32B 27/32 | (2006.01) | |
| C08L 23/06 | (2006.01) | |
| B32B 27/06 | (2006.01) | |
| C09D 163/00 | (2006.01) | |
| C08L 23/08 | (2006.01) | |
| C08K 5/103 | (2006.01) | |

(52) U.S. Cl.
CPC ............. *B32B 27/08* (2013.01); *B32B 27/06* (2013.01); *B32B 27/20* (2013.01); *B32B 27/32* (2013.01); *C08K 5/103* (2013.01); *C08L 23/06* (2013.01); *C08L 23/08* (2013.01); *C09D 163/00* (2013.01); *B32B 2250/03* (2013.01); *B32B 2250/242* (2013.01); *B32B 2250/44* (2013.01); *B32B 2264/0242* (2013.01); *B32B 2264/0278* (2013.01); *B32B 2264/10* (2013.01); *B32B 2264/102* (2013.01); *B32B 2307/40* (2013.01); *B32B 2307/412* (2013.01); *B32B 2307/70* (2013.01); *B32B 2307/728* (2013.01); *B32B 2323/046* (2013.01); *B32B 2410/00* (2013.01); *C08G 2650/58* (2013.01)

(58) Field of Classification Search
None
See application file for complete search history.

(56) References Cited

U.S. PATENT DOCUMENTS

| | | | |
|---|---|---|---|
| 6,784,235 B2 | 8/2004 | Gupta et al. | |
| 2001/0047046 A1* | 11/2001 | Gupta | C08J 5/18 524/376 |
| 2008/0027182 A1 | 1/2008 | McNamara et al. | |
| 2013/0097922 A1 | 4/2013 | Lempidakis et al. | |

FOREIGN PATENT DOCUMENTS

| | | |
|---|---|---|
| CN | 1077034 C | 1/2002 |
| CN | 102241175 A | 11/2011 |
| CN | 102922839 A | 2/2013 |
| CN | 104108215 A | 10/2014 |
| EP | 0861870 A1 | 9/1998 |
| JP | 2000280424 A | 10/2000 |
| JP | 2000343655 A | 12/2000 |
| JP | 2001334612 A | 12/2001 |
| JP | 2003125655 A | 5/2003 |
| JP | 2005047097 A | 2/2005 |
| WO | 2017/045198 A1 | 3/2017 |

OTHER PUBLICATIONS

PCT/CN2015/089986, International Search Report & Written Opinion dated Jun. 22, 2016.
PCT/CN2015/089986, International Preliminary Report on Patentability dated Mar. 20, 2018.

* cited by examiner

*Primary Examiner* — Robert T Butcher

(57) ABSTRACT

A multi-layer film comprising: a) a first layer comprising i) a polyolefin component; and ii) a polyethylene oxide/polyethylene copolymer having a Hydrophile-Lipophile Balance value in the range of from 2 to 6; b) a second layer comprising i) a polyolefin component; ii) from 1 to 5 weight percent of an additive selected from the group consisting of sorbitan esters, polyoxyethylene esters, glycerol esters, polyglycerol esters, fluorine-based compounds and combinations thereof, wherein the additive has a Hydrophile-Lipophile Balance value in the range of from 7 to 18; and iii) an inorganic filler; wherein the second layer is adjacent to the first layer and c) a skin layer comprising a polyolefin component, is disclosed. The multi-layer film is used in greenhouse applications.

6 Claims, 3 Drawing Sheets

MULTI-LAYER GREENHOUSE FILM WITH SUPERIOR ANTI-DRIPPING PERFORMANCE

FIELD OF THE INVENTION

The present invention is related to polyolefin films. More particularly, the present invention is related to polyolefin films used in greenhouse applications.

BACKGROUND

Dripping is a phenomenon commonly occurring due to temperature difference of the inside atmosphere and the outside atmosphere of an "enclosed body" and localized cooling at the interface. The atmosphere within greenhouses surrounded by agricultural film is saturated with water vapor which evaporates from the soil or from the plants, because the surface tension of water is very high (about 72 mN/m) and the surface energy of greenhouse films, which usually made from polyethylene (PE), ethylene-vinyl acetate (EVA) or polyvinylchloride (PVC), is low, the water vapor condenses dropwise on the inner surface of the cold film to cause water dripping. Water droplets on the film greatly reduce the incident sunlight due to irregular reflection and the droplets that fall on the plants can result in physical damage of the crops.

Therefore, to avoid dripping, anti-dripping treatments are used to make the inner surface of greenhouse films hydrophilic in nature or to reduce water surface tension by adding surfactants. Both methods can cause vapor condensed droplets to spread on the surface and drain away, assuring transmission of sunlight into the greenhouse and reducing physical damage to plants.

Currently, most of the anti-dripping films available on the market are incorporated with low molecular weight additives (e.g., nonionic surfactants such as sorbitan esters, polyoxyethylene esters, glycerol esters, and polyglycerol esters) which migrate from the bulk film matrix to the surface of the plastic films. These low molecular weight surfactants on the surface can dissolve in water and reduce water surface tension, so that the "modified water" can spread on the film. Typical anti-dripping additive concentration ranges from 1 to 5 weight percent. Multi-layer films, especially 3-layer films, have been widely used for greenhouse applications. For most of 3-layer films on market, the low molecular weight additives are incorporated into both the inner and middle layers of the film, with identical anti-dripping formulation in these two layers. The middle layer acts as reservoir for anti-dripping additives. However, normally most of these commercially available surfactant additives do not have good affinity with non-polar polyethylene film matrices. These additives can diffuse out of the film quickly and be easily washed away from the film surface by condensed water, leading to reduced anti-dripping service time and the loss of the film's anti-dripping performance in a relatively short time.

Therefore, anti-dripping additives with a longer service time are desired.

SUMMARY OF THE INVENTION

In an embodiment of the instant invention, there is disclosed a multi-layer film comprising: a) a first layer comprising i) a polyolefin component; and ii) a polyethylene oxide/polyethylene copolymer having a structure selected from the group consisting of $CH_3CH_2(CH_2CH_2)_aCH_2CH_2(OCH_2CH_2)_bOH$ and $CH_3CH_2(CH_2CH_2)_aCO(OCH_2CH_2)_bOH$ wherein a is from 9 to 25 and b is from 1 to 10; and wherein the polyethylene oxide/polyethylene copolymer has a Hydrophile-Lipophile Balance value in the range of from 2 to 6; b) a second layer comprising i) a polyolefin component; ii) from 1 to 5 weight percent of an additive selected from the group consisting of sorbitan esters, polyoxyethylene esters, glycerol esters, polyglycerol esters, fluorine-based compounds and combinations thereof, wherein the additive has a Hydrophile-Lipophile Balance value in the range of from 7 to 18; and iii) an inorganic filler; wherein the second layer is adjacent to the first layer and c) a skin layer comprising a polyolefin component.

BRIEF DESCRIPTION OF THE DRAWINGS

For the purpose of illustrating the present invention, the drawings show a form of the present invention which is presently preferred. However, it should be understood that the present invention is not limited to the embodiments shown in the drawings.

DETAILED DESCRIPTION OF THE INVENTION

Figure 1:
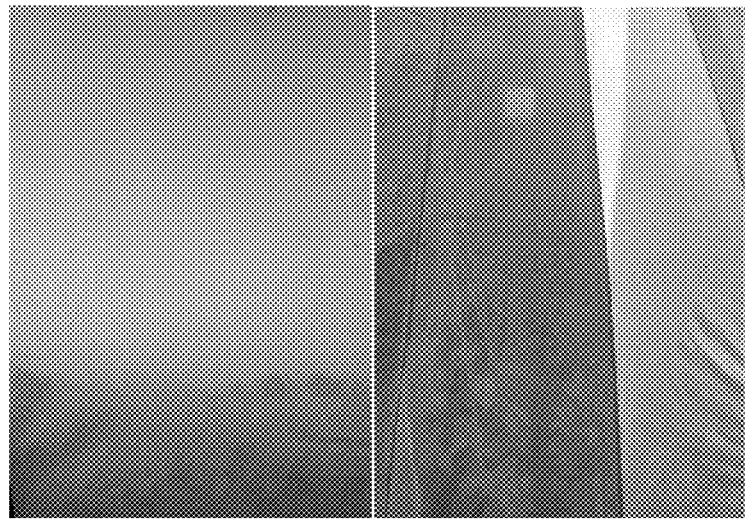
FIG. 1 shows photos of Example 1 film taken after an 80 day field test (left: photo taken inside out; right: photo taken outside in).

One broad aspect of the present invention comprises, consists of, or consists essentially of a) a first layer comprising i) a polyolefin component; and ii) a polyethylene oxide/polyethylene copolymer having a structure selected from the group consisting of $CH_3CH_2(CH_2CH_2)_aCH_2CH_2(OCH_2CH_2)_bOH$ and $CH_3CH_2(CH_2CH_2)_aCO(OCH_2CH_2)_bOH$ wherein a is from 9 to 25 and b is from 1 to 10 wherein the polyethylene oxide/polyethylene copolymer has a Hydrophile-Lipophile Balance value in the range of from 2 to 6; b) a second layer comprising i) a polyolefin component; ii) from 1 to 5 weight percent of an additive selected from the group consisting of sorbitan esters, polyoxyethylene esters, glycerol esters, polyglycerol esters, and combinations thereof, wherein the additive has a Hydrophile-Lipophile Balance value in the range of from 7 to 18; and iii) an inorganic filler; wherein the second layer is adjacent to the first layer and c) a skin layer comprising a polyolefin component.

The first layer comprises at least one polyolefin component. Examples of polyolefins include, but are not limited to polymers of monoolefins and diolefins, for example polypropylene, polyisobutylene, polybut-1-ene, poly-4-methylpent-1-ene, polyisoprene or polybutadiene, as well as polymers of cycloolefins, such as of cyclopentane or norbornene, polyethylene, for example, high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), and linear low density polyethylene (LLDPE).

Mixtures of the above polyolefins can be used, for example mixtures of polypropylene with polyisobutylene, polypropylene with polyethylene (for example PP/HDPE) and mixtures of different types of polyethylenes (for example LDPE/HDPE).

Other examples of the polyolefin component include copolymers of monoolefins and diolefins with each other or with other vinyl monomers, for example ethylene/propylene copolymers, LLDPE, and mixtures thereof with LDPE, proplylene/but-1-ene copolymers, propylene/isobutylene copolymers, ethylene/but-1-ene copolymers, ethylene/hexane copolymers, ethylene/methylpentene copolymers, ethylene/heptene copolymers, ethylene/octane copolymers, propylene/butadiene copolymers, isobutylene/isoprene copolymers, ethylene/alkyl methacrylate copolymers, ethylene/vinyl acetate copolymers and their salts as well as terpolymers of ethylene with propylene and a diene such as hexadiene, dicyclopentadiene or ethylidene-norbornene; and mixtures of such copolymers with each other and with other polymers mentioned above, such as for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and mixtures thereof.

The first layer also comprises a copolymer with a hydrophobic polyethylene oxide/polyethylene copolymer. This copolymer generally has a structure selected from the group consisting of $CH_3CH_2(CH_2CH_2)_aCH_2CH_2(OCH_2CH_2)_bOH$ and $CH_3CH_2(CH_2CH_2)_aCO(OCH_2CH_2)_bOH$ wherein a is from 9 to 25 and b is from 1 to 10.

The Hydrophile-Lipophile Balance (HLB) value for the hydrophobic polyethylene oxide/polyethylene copolymer is generally in the range of from 2 to 6. Any range within 2 to 6 is included herein and disclosed herein, for example, the HLB value can be 2 to 5, 3 to 5, or 4 to 6.

The polyethylene oxide/polyethylene copolymer is generally present in the first layer in an amount in the range of from 1 to 5 weight percent. Any and all ranges within 1 and 5 weight percent are incorporated herein and disclosed herein, for example, the copolymer can be present in the first layer in an amount in the range of from 1 to 4 weight percent, 1 to 3 weight percent, or 2 to 3 weight percent, or 3 to 5 weight percent.

—Component (b)—Second Layer

The second layer of the film is adjacent to the first layer. The second layer comprises a polyolefin component. The polyolefin can be selected from any of the polyolefins listed above. In various embodiments, the polyolefin component can be LDPE or LLDPE.

The second layer also contains a hydrophilic additive. This additive is selected from the group consisting of sorbitan esters, polyoxyethylene esters, glycerol esters, polyglycerol esters, fluorine-based compounds and combinations thereof. These additives have relatively small molecular weight (generally, a molecular weight lower than 500). One example of a commercially available anti-dripping agent is LY-6 from Lin'an auxiliary.

The HLB value for the hydrophilic additives is generally in the range of from 7 to 18. Any range within 7 to 18 is included herein and disclosed herein, for example, the HLB value can be 8 to 16, 10 to 15, or 11 to 14.

The additive is generally present in the second layer in an amount in the range of from 1 to 5 weight percent. Any and all ranges within 1 and 5 weight percent are incorporated herein and disclosed herein, for example, the additive can be present in the second layer in an amount in the range of from 1 to 4 weight percent, 1 to 3 weight percent, or 2 to 3 weight percent, or 3 to 5 weight percent.

The second layer further comprises an inorganic filler. The filler can have a porous structure. Examples of inorganic fillers that can be used include, but are not limited to diatomite, zeolites, porous silica, porous titania, porous alumina, and attapulgite. The inorganic filler is incorporated into this layer to control and/or reduce the migration rate of the hydrophilic additive.

The inorganic filler is generally present in the second layer in an amount in the range of from 0.5 to 5 weight percent. Any and all ranges within 0.5 and 5 weight percent are incorporated herein and disclosed herein, for example, the inorganic filler can be present in the second layer in an amount in the range of from 0.5 to 4 weight percent, 1 to 4 weight percent, 1 to 3 weight percent, or 2 to 3 weight percent.

—Component (c)—Skin Layer

The outer, or skin layer of the film comprises a polyolefin component. The polyolefin can be selected from any of the polyolefins listed above. In various embodiments, the polyolefin component can be LDPE or LLDPE.

The film can further comprise an additional 1 to 4 layers having a polyolefin component. The polyolefin can be selected from those listed above. These additional layers are between the second layer and the skin layer. Any value in the range of from 1 to 4 is incorporated herein and disclosed herein; for example, there can be 1, 2, 3, or 4 additional layers.

Optional Components

In some embodiments, antioxidants can be present in the film. Examples of antioxidants include but are not limited to alkylated monophenols, alkylated hydroquinones, hydroxylated thiodiphenyl ethers, alkyldiene bisphenols, benzyl compounds, acylaminophenols, esters of b-(3,5-di-tert-butyl-4-hydroxyphenyl)-propionic acid with monohydric or polyhydric alcohols, esters of b-(5-tert-butyl-4-hydroxy-3-methylphenyl)-propionic acid with monohydric or polyhydric alcohols, amides of b-(3,5-di-tert-butyl-4-hydroxyphenyl)-propionic acid and combinations thereof.

In some embodiments UV stabilizers can be present in the film. Examples of UV stabilizers include but are not limited to 2-(2'-Hydroxyphenyl)-benzotriazoles, 2-hydroxy-benzophenones, esters of substituted benzoic acids, acrylates, malonates, sterically hindered amines, hydroxyphenyl-s-triazines, and combinations thereof.

Process for Producing the Composition

It is preferred that the multilayer films of the present invention be formed in the blown film process as is generally known in the art, although other methods such as cast films, or lamination can be used.

Examples

Raw materials used are shown in Table 1.

TABLE 1

Raw material information.

| Component | Grade name | Characteristic | HLB value | Supplier |
|---|---|---|---|---|
| LLDPE | Dowlex ™ 2045 | Linear low density PE | — | Dow |

TABLE 1-continued

Raw material information.

| Component | Grade name | Characteristic | HLB value | Supplier |
|---|---|---|---|---|
| LDPE | LDPE 143I | LDPE, grinded to powder before use | — | Dow |
| PEO-PE | Unithox 420 | Polydispersed poor soluble PEO-PE with 20% EO content and 32 carbons chain in average | 4 | Baker Hughes |
| PEO-PE | Unithox 450 | Polydispersed water soluble PEO-PE with 50% EO content and 32 carbons chain in average | 10 | Baker Hughes |
| C18-EO9 | C18-EO9 | Monodispersed water soluble PEO-PE with 9 EO units and 18 carbons chain | 12 | Jiangsu Haian Chemical |
| LY-6 | LY-6 | Commercially available anti-dripping agent usually used in PE and EVA system | — | Lin'an auxiliary agent |
| Diatomite | Diatomite | Inorganic filler with particle size at 1-2 um | — | |
| UV 944 | Chimassorb 944 | UV stabilizer | — | BASF |
| AO B900 | Irganox B900 | Anti-oxidant | — | BASF |
| FS | TS-403 | Fluorine based anti-fog agents | — | Taiwan Fengsheng |

Film Preparation Process:

Compounding

First, a masterbatch of UV 944 and AO B900 in LLDPE resin was prepared by using a twin-screw extruder. A masterbatch of anti-fog (TS-403) was prepared in the same method. These masterbatches in pellet form, together with anti-dripping agents and inorganic filler (if there was filler in the formulation), were mixed together with LDPE powder. The content of UV 944 and AO B900 in final film formulation was 1.0 and 0.2 wt %, respectively. Compounding was then carried out on a 40 mm twin-screw extruder. LLDPE was fed from one feeder and LDPE powder with all the other additives was fed from another feeder. The temperature was set at around 180° C. and the screw speed was 250 rpm. The melt temperature was measured at around 230° C.

Pellets from the compounding process were fully dried before the film blowing process.

All the formulations for this invention are summarized in Table 2. Example 1 used hydrophobic PEO-PE (Unithox 420) as additive for inner layer. 1.0% of C18-EO9 and 1.0% of Unithox 450 were also incorporated into the inner layer to further increase surface hydrophilicity. Low molecular weight additive LY-6 was mixed with diatomite to be incorporated into middle layer.

Comparative Example A had the same anti-dripping formulations as Example 1 in both the inner layer and middle layer, but had no diatomite in the middle layer. Comparative Examples B, C, and D had identical additives and additive amounts for the inner layer and middle layer. Comparative Example B had the same inner layer additives as Example 1. Comparative Example C had the same anti-dripping additives as the middle layer of Example 1. Comparative Example D had both additives and fillers in the inner/middle layer. Comparative Example E had the same middle layer as Example 1, but with no hydrophobic PEO-PE in the inner layer.

TABLE 2

Formulations for different layers of films.

Anti-dripping Additives and Fillers (wt %)

| Sample ID | Inner layer | Middle layer | Outer layer |
|---|---|---|---|
| Example 1 | Unithox 420 1.0%/Unithox 450 1.0%/C18-EO9 1.0% | LY-6 3.0%/Diatomite 2.5% | NA |
| Comp Example A | Unithox 420 1.0%/Unithox 450 1.0%/C18-EO9 1.0% | LY-6 3.0% | NA |
| Comp Example B | Unithox 420 1.0%/Unithox 450 1.0%/C18-EO9 1.0% | Unithox 420 1.0%/Unithox 450 1.0%/C18-EO9 1.0% | Unithox 420 0.3%/Unithox 450 0.3%/C18-EO9 0.3% |
| Comp Example C | LY-6 3.0% | LY-6 3.0% | LY-6 1.0% |
| Comp Example D | LY-6 3.0%/Diatomite 1.5% | LY-6 3.0%/Diatomite 1.5% | LY-6 1.0% |
| Comp Example E | LY-6 3.0% | LY-6 3.0%/Diatomite 2.5% | LY-6 1.0% |

Film Blowing

The films were prepared on a 3-layer blown film line. The blown up ratio (BUR) was around 2.5. Film thickness was controlled at around 100 um. Layer thickness was 1/1/1.

Optical Property Test:

Haze of film samples was tested on a BYK Gardner haze meter. Ethanol was used to clean additives that bloomed out on the film surface before the optical test.

Film Accelerated Anti-Dripping Test:

The film anti-dripping performance was tested according to Chinese National Standard GB 4455-2006. The film was clamped on a cage of a water bath to form an enclosed space and there is a 15 degree slope angle of the film generated by a pressing cone. The water in the water bath was heated to 60° C. and the water vapor condensed and formed a thin layer of water on the PE film. Condensed water flowed back to the water bath and the anti-dripping agent gradually washed away. Non-transparent water droplet and/or transparent water flakes/streams formed onto the inner surface of the film and lost anti-dripping performance. The criteria of failure were set as:

1. Non-transparent water droplet area larger than 30% of the total film area.
2. Area with water flakes/streams larger than 50% of the total film area.

The anti-dripping service time was recorded (days) when the anti-dripping performance failed.

Field Test of Anti-Dripping Performance:

Greenhouses were built by using films from this inventive study. Field testing was conducted in northern China. The greenhouses are 60 m in length, 8 m in width, and 3 m in height. The test was conducted from April to June 2015, with an environmental temperature change in the range of −2 to 35° C. Humidity inside the greenhouse was recorded to be in the range of 30 to 80%.

Results:

The anti-dripping performance of all the film samples is summarized in Table 3.

TABLE 3

Anti-dripping test and optical test results for different films.

| Film ID | Anti-dripping lifetime @ 60° C. In-house test (days) | Field Trial Result after 80 days | Haze |
|---|---|---|---|
| Example 1 | 65 | Transparent, no water stream | 20.0% |
| Comp Example A | 19 | Transparent, no water stream | 19.7% |
| Comp Example B | 23 | Water stream | 19.1% |
| Comp Example C | 16 | Water stream | 21.7% |
| Comp Example D | 25 | Water stream | 24.0% |
| Comp Example E | In test, but found water droplets from 5$^{th}$ day | NA | 23.0% |

Figure 2:
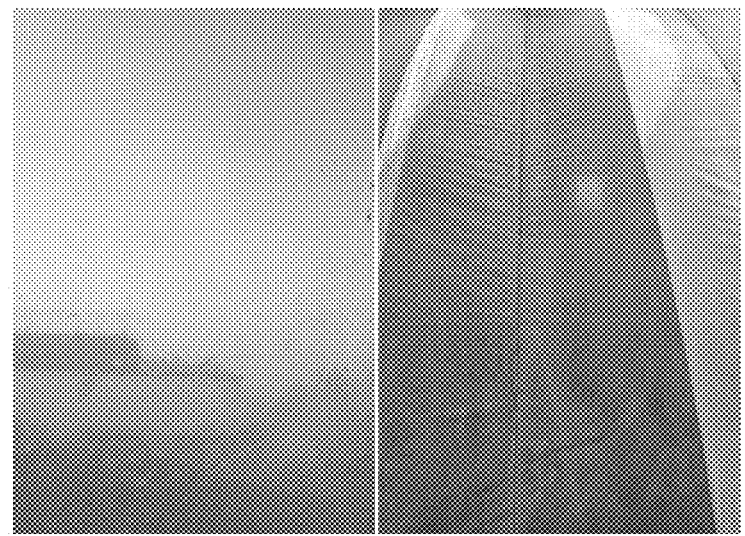
FIG. 2 shows photos of Comparative Example A film taken after an 80 day field test (left: photo taken inside out; right: photo taken outside in).
Figure 3:
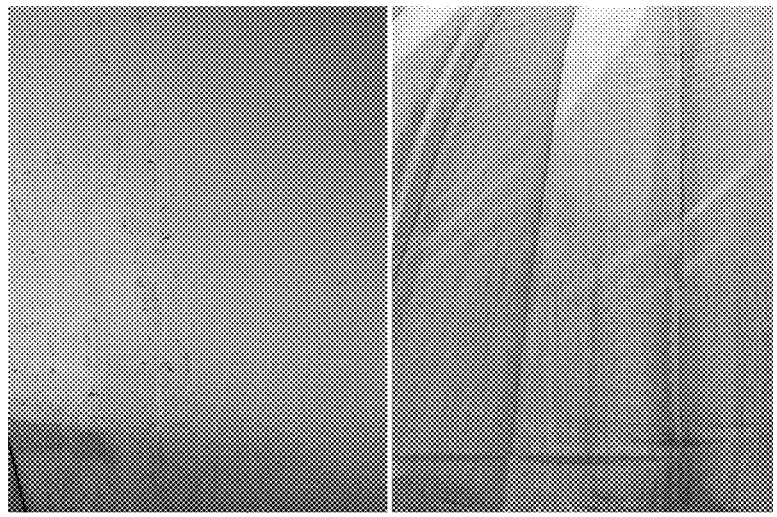
FIG. 3 shows photos of Comparative Example B film taken after an 80 day field test (left: photo taken inside out; right: photo taken outside in).
Figure 4:
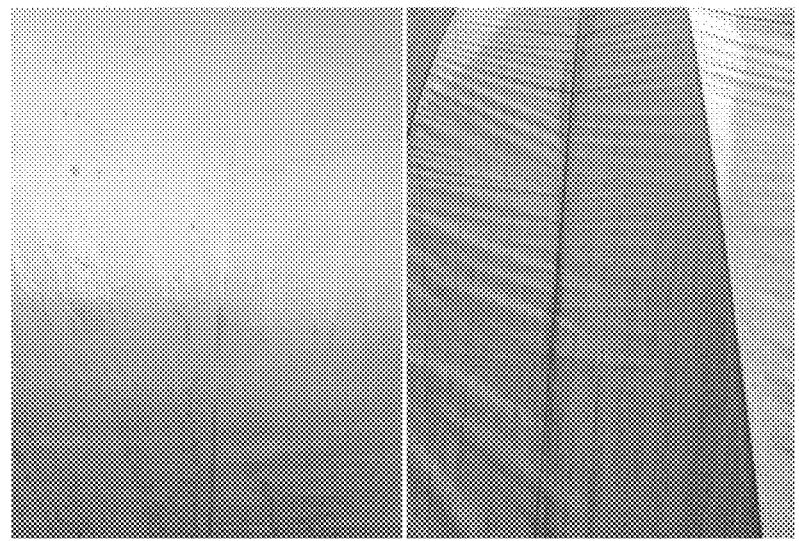
FIG. 4 shows photos of Comparative Example C film taken after an 80 day field test (left: photo taken inside out; right: photo taken outside in).
Figure 5:
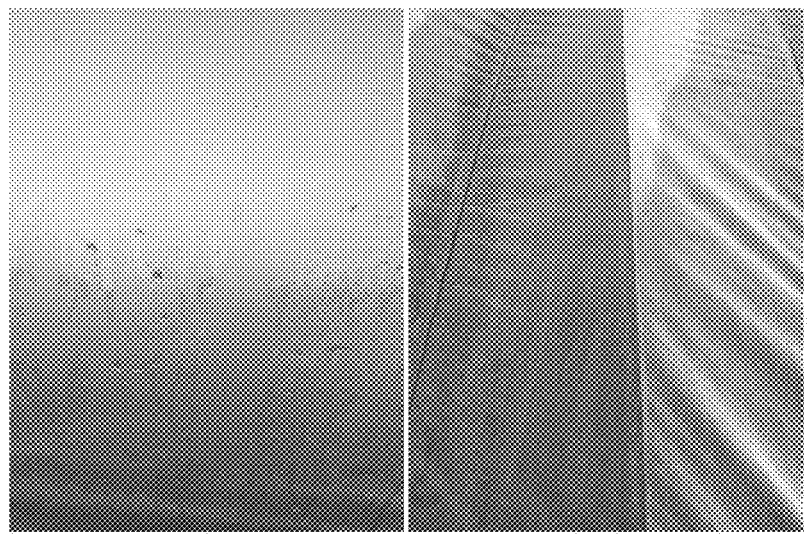
FIG. 5 shows photos of Comparative Example D film (left: photo taken inside out; right: photo taken outside in).

After 80 days of field testing, anti-dripping performance of different film samples are shown in FIGS. 1-5. Example 1 showed good anti-dripping performance. The film from Example 1 maintained good transparency through the testing time, no water droplets or fog could be found on the film surface.

Comparative Example A, with no diatomite added in the middle layer, also showed excellent anti-dripping performance after the 80 day field trial. But from the accelerated test results, it is evident that the inventive example had much longer anti-dripping lifetime. The addition of diatomite could encapsulate the LY-6 and slow down the diffusion, resulting in a much longer anti-dripping performance.

For Comparative Examples B, C and D, small droplets were condensed on the inner surface. These water droplets led to greatly reduced film transparency.

For Comparative Example E, when hydrophilic surfactant (LY-6) replaced the hydrophobic PEO/PE copolymer in the inner layer, water droplets were found after the 5 day accelerated test, while our Inventive Example 1 maintained transparency with no droplet formation for >27 days.

Another advantage of this invention study is that adding filler in the middle layer reduces the negative effect to optical properties (caused by filler addition). As shown in Table 3, compared with Comparative Example A (no filler in film), Example 1 showed a minor increase in haze. Comparative Example D, to which filler was added in the surface layer (inner layer), had a much larger haze increase.

What is claimed is:

1. A multi-layer film comprising:
   a) a first layer comprising
      i) a polyolefin component; and
      ii) a polyethylene oxide/polyethylene copolymer having a structure selected from the group consisting of $CH_3CH_2(CH_2CH_2)_aCH_2CH_2(OCH_2CH_2)_bOH$ and $CH_3CH_2(CH_2CH_2)_aCO(OCH_2CH_2)_bOH$ wherein a is from 9 to 25 and b is from 1 to 10; and wherein the polyethylene oxide/polyethylene copolymer has a Hydrophile-Lipophile Balance value in the range of from 2 to 6;
   b) a second layer comprising
      i) a polyolefin component;
      ii) from 1 to 5 weight percent of an additive selected from the group consisting of sorbitan esters, polyoxyethylene esters, glycerol esters, polyglycerol esters, fluorine-based compounds and combinations thereof, wherein the additive has a Hydrophile-Lipophile Balance value in the range of from 7 to 18; and
      iii) an inorganic filler;
   wherein the second layer is adjacent to the first layer and positioned between the first layer and a skin layer
   c) the skin layer comprising a polyolefin component.

2. The multi-layer film of claim 1, further comprising from 1 to 4 polyolefin layers between the second layer and the skin layer.

3. The multi-layer film of claim 1 wherein the inorganic filler is selected from the group consisting of diatomite, zeolites, porous silica, porous titania, porous alumina, and attapulgite and is present in the second layer in the range of from 0.5 weight percent to 5 weight percent.

4. The multi-layer film of claim 1 wherein the polyethylene oxide/polyethylene copolymer is present in the first layer in the range of from 1 weight percent to 5 weight percent.

5. The multi-layer film of claim 1 wherein the skin layer comprises a polyolefin component selected from the group consisting of low density polyethylene, linear low density polyethylene, and combinations thereof.

6. A greenhouse film prepared from the multi-layer film of claim 1.

* * * * *